United States Patent [19]

Fulmer et al.

[11] Patent Number: 4,681,196
[45] Date of Patent: Jul. 21, 1987

[54] CONTROL CIRCUIT FOR BRAKE BOOSTER VEHICULAR HILL HOLDER SYSTEM

[75] Inventors: Keith H. Fulmer, Mishawaka, Ind.; Arthur K. Peebles, Niles, Mich.; Hugh D. Steininger, South Bend, Ind.

[73] Assignee: Allied Corporation, Morristown, N.J.

[21] Appl. No.: 642,619

[22] Filed: Aug. 20, 1984

[51] Int. Cl.⁴ .................. B60K 41/24; B60K 5/00; F15B 7/00; B60T 8/58

[52] U.S. Cl. .................. 192/3 H; 192/13 A; 60/545; 91/32; 180/282; 188/190; 303/100

[58] Field of Search .................. 60/595; 91/6, 32; 180/282; 188/190; 303/100; 192/3 H, 0.048, 0.049, 0.094, 13 A

[56] References Cited

U.S. PATENT DOCUMENTS

| | | | |
|---|---|---|---|
| 2,197,721 | 4/1940 | Goepfrich | 192/3 H |
| 2,262,842 | 11/1941 | Goepfrich | 192/13 A |
| 2,594,155 | 4/1952 | Guernsey et al. | 192/3 H |
| 3,023,053 | 2/1962 | Hager | 303/7 |
| 3,237,526 | 3/1966 | Hayes et al. | 91/376 |
| 3,364,818 | 1/1968 | Hager et al. | 91/32 |
| 3,498,426 | 3/1970 | Nakano | 192/13 A |
| 3,632,176 | 1/1972 | Gaeke | 303/100 |
| 3,856,105 | 12/1974 | Lewis et al. | 180/98 |
| 3,871,497 | 3/1975 | Bessiere | 192/3 |
| 3,880,049 | 4/1975 | Grabb et al. | 91/33 |
| 3,921,501 | 11/1975 | Rosback | 91/32 |
| 4,247,154 | 1/1981 | Shoji et al. | 303/24 A |
| 4,499,812 | 2/1985 | Pressaco et al. | 92/168 |
| 4,515,259 | 5/1985 | Ha | 192/3 |
| 4,618,040 | 10/1986 | Honma et al. | 192/0.094 X |

FOREIGN PATENT DOCUMENTS

| | | | |
|---|---|---|---|
| 573144 | 3/1959 | Canada | 60/545 |
| 3329305 | 2/1984 | Fed. Rep. of Germany | 60/547.1 |
| 2144187 | 2/1985 | United Kingdom | |

Primary Examiner—Robert E. Garrett
Assistant Examiner—George Kapsalas
Attorney, Agent, or Firm—Larry J. Palguta; Ken C. Decker

[57] ABSTRACT

A brake booster (10, 210, 310) connected to a control circuit (120) provides a system for the continued braking of a vehicle when the vehicle is situated on an incline and the brake pedal (92) is released by the operator. Continued brake application is accomplished by utilizing a control circuit (120) responsive to vehicular attitude, clutch pedal position, ignition status, vehicular speed, and vehicular direction. The control circuit (120) is connected to the combination of a check valve and three-way solenoid valve (100, 200, 300) connected to a movable wall brake booster (10, 210, 310). The combination valve (100) is connected to a flexible hose (110) disposed interiorily of the booster (10), the other end of the flexible hose (110) connected to the input opening (32) of a three-way poppet valve (70) located at the central hub (30) of the booster (10). When the control circuit (120) senses that the vehicle is on an incline, the clutch pedal depressed, the ignition "on", the speed is zero, and the vehicle not backing up, it actuates the three-way solenoid of valve (100) which continues to supply a first fluid pressure to the front booster chamber (40) while supplying a second fluid pressure for the rear booster chamber (50) via the flexible hose (110) and poppet valve (70). The vehicle operator may release the brake pedal (92) which returns slightly toward an inactive position and which opens slightly valve (70), with the brakes remaining activated because the second fluid pressure is provided to the rear chamber (50) via the hose connection (110) and valve (70) to maintain the axially displaced position of the movable wall (24).

31 Claims, 7 Drawing Figures

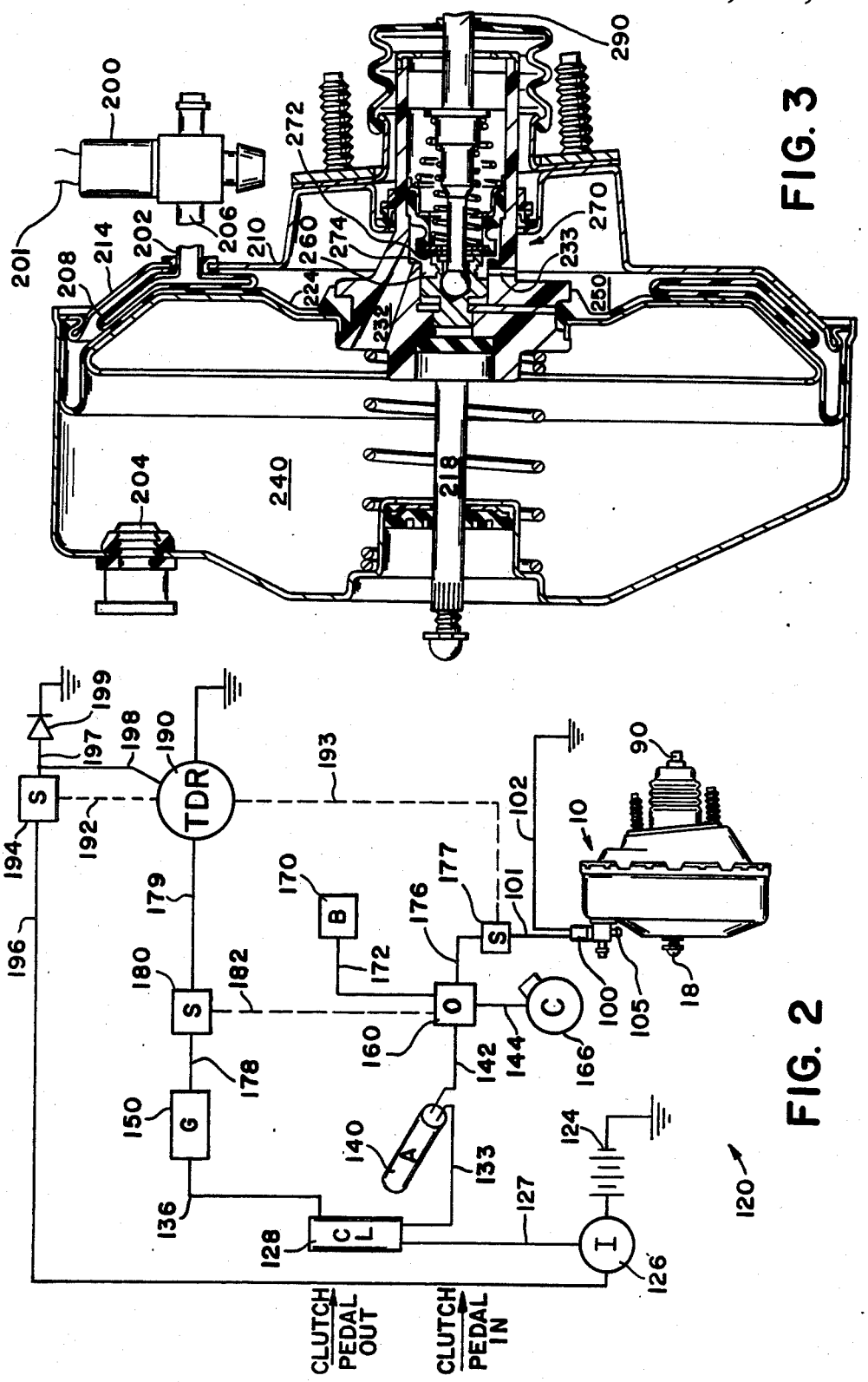

CONTROL CIRCUIT FOR BRAKE BOOSTER VEHICULAR HILL HOLDER SYSTEM

BACKGROUND OF THE INVENTION

The present invention relates to a vehicular hill holder system which includes a control circuit and a booster operable by either vacuum pressure or compressed air.

Car manufacturers are attempting to provide an economical solution for a long-standing problem with manual shft vehicles: how to permit the vehicle operator to manipulate the clutch pedal, brake pedal, accelerator pedal, and shift the gear lever when the vehicle is stationary on an incline. Such inclines are common at railroad crossings and in rural and metropolitan areas.

A solution to this problem is provided by mechanical roll-back lock devices that effect the mechanical lockup of the brake pedal through mechanical mechanisms connected to the brake and clutch pedals. However, such devices occupy additional cab space and require assembly and installation costs that are an add-on to the vehicle cost.

SUMMARY OF THE INVENTION

It is an object of the present invention to provide an inexpensive, practical vehicular hill holder system brake booster which utilizes presently existing equipment on manual shift vehicles. It is desirable that such a system may be included as either optional or original equipment on a manual shift vehicle, without requiring significant modification of the vehicle's equipment or any significant increase in cost.

The present invention comprises a vehicular hill holder system which utilizes presently existing booster equipment. A brake booster constructed in accordance with the present invention is connected to a control circuit which provides for continued braking of a vehicle when the vehicle is situated on an incline and the brake pedal released by the vehicle operator. Continued braking of the vehicle is accomplished by a control circuit responsive to vehicular attitude, clutch position, ignition status, vehicular speed, and vehicular direction. The control circuit is connected to the combination of a check valve and three-way solenoid valve connected with the casing of a moveable wall brake booster. The check valve and three-way solenoid valve are connected to a flexible hose disposed interiorly of the casing, the other end of the flexible hose being connected to the input opening of a three-way valve located at the center hub of the brake booster. When the control circuit senses that the vehicle is on an incline, the clutch depressed, the ignition "on", the speed is zero, and that the vehicle is not backing up, it actuates the three-way solenoid valve which permits the continued supply of a first fluid pressure to the front booster chamber while supplying a second fluid pressure to the rear booster chamber via the flexible hose and three-way valve. The vehicle operator may release his foot from the brake pedal and the brakes remain activated because of the second fluid pressure being provided to the rear chamber to maintain the axially displaced position of the movable wall. Alternative embodiments which maintain the displaced position of the movable wall include the use of an inflatable bladder and a centrally disposed bellows.

The invention is described in detail below with reference to the drawings which illustrate various embodiments of the invention, in which:

BRIEF DESCRIPTION OF THE DRAWINGS

FIG. 2 is a schematic representation of the brake booster of FIG. 1 and the control circuit connected thereto;

FIG. 3 is a cross-section view of an alternative embodiment of a brake booster utilized in the present invention;

DESCRIPTION OF THE PREFERRED EMBODIMENTS

Figure 1:
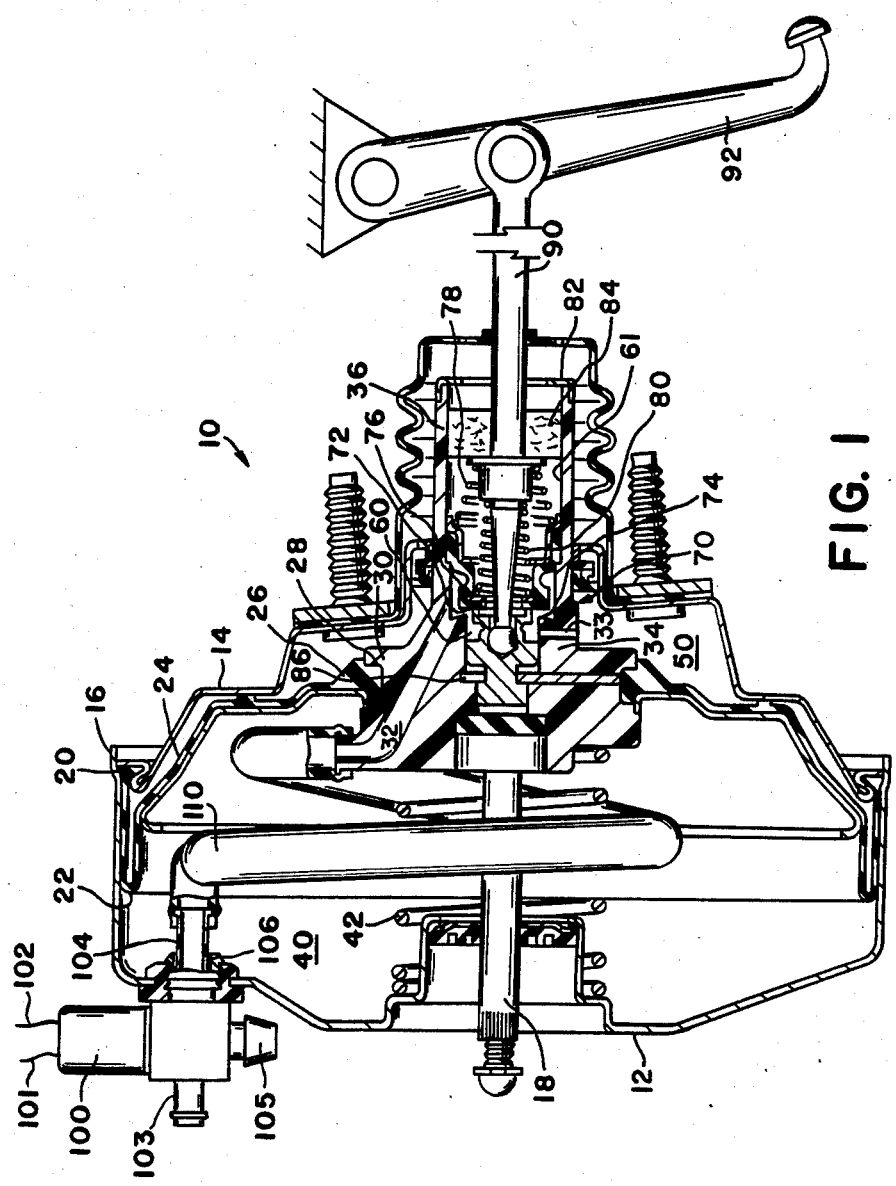
FIG. 1 is a cross-section view of a brake booster constructed in accordance with the present invention.

Referring to FIG. 1, there is illustrated a servomotor or brake booster 10 of the present invention. It should be clearly understood that the brake boosters or servomotors utilized in the present invention may take many different forms of conventional brake boosters being manufactured today. Only slight modification is required in order for a booster unit to be used in the present invention, and almost any conventional vacuum or compressed air booster unit may be utilized. Thus, the brake booster vehicular hill holder provides a low-cost, inexpensively manufactured unit because many of the present-day brake booster units may be utilized.

The booster 10 comprises a front shell 12 and a rear shell 14 which are attached together at rim portion 16. A master cylinder (not shown) would be attached to the booster 10, and provide an actuating means for operating the brakes of the vehicle when the master cylinder is actuated by the actuating rod 18. The front and rear shells 12, 14 are attached together at connection section 16 so as to trap the external bead 20 of the flexible diaphragm 22. Flexible diaphragm 22 is secured to movable wall 24 within the interior of the servomotor or booster unit 10. Diaphragm 22 terminates radially inwardly in an internal bead 26 received within a groove 28 of the central hub 30.

Diaphragm 22 of movable wall 24 divides booster unit 10 into a front chamber 40 and a rear chamber 50. Disposed within front chamber 40 is a return spring 42 having one end mounted against front shell 12 and the other end engaging the central hub 30. Central hub 30 includes a first passage 32 which, in conventional booster uints, provides communication between front chamber 40 and internal bore 60. Central hub 30 also includes a body portion 34 which extends rearwardly to form the rearward projection 36 and bore 61. Bore 60 extends toward rearward projection 36, and disposed in bore 60 is a standard poppet valve 70. Body portion 34 includes a second passage 33 providing communication between rear chamber 50 and bore 60. Valve 70 comprises a conventional and well-known poppet valve structure utilized in many different booster embodiments and applications. Included within valve 70 is a first valve seat 72, second valve seat 74, poppet member 76, first spring 78, second spring 80, rear opening 82, filter 84, and a key 86. Extending through bore 60 and operatively coupled to valve 70, is an input rod 90 operatively coupled to the vehicle's brake pedal 92. The operation of valve 70 is conventional in performance.

Figure 4:
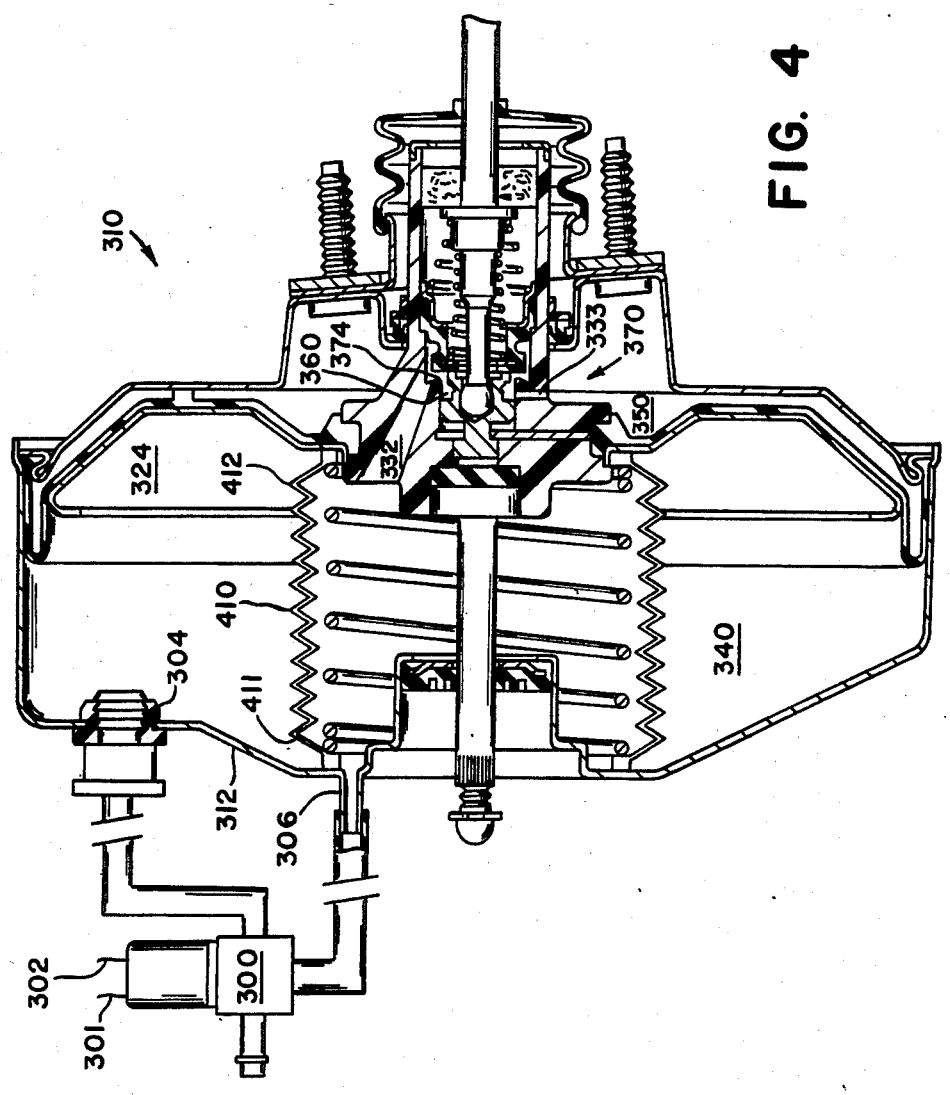
FIG. 4 is another embodiment of a brake booster utilized in the present invention and FIGS. 5-7 illustrate control valves associated with the brake boosters of FIGS. 1, 3, and 4.
Figure 5:
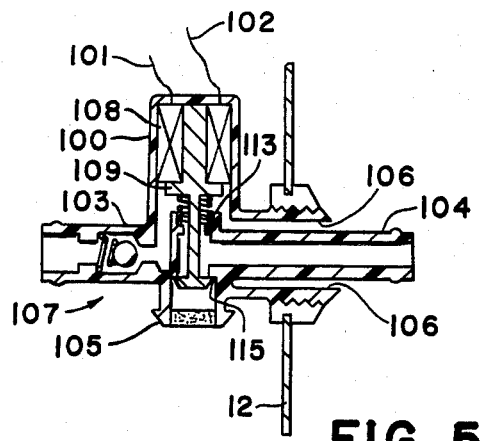

Modification of booster unit 10 is provided by combination valve 100 mounted to front shell 12. Combination valve 100 is mounted to the front shell 12 purely as a matter of convenience; valve 100 may be mounted at various other locations within the vehicle and need not be mounted directly to the front shell. Combination valve 100 comprises the combination of a check valve and three-way solenoid valve, as illustrated by the various embodiments in FIGS. 1, 3, and 4. The solenoid valve is connected by wires 101, 102 to the control circuit illustrated in FIG. 2 and which will be explained hereinafter. An air cleaner 105 is located at the bottom of valve 100 which has an input connection 104 extending through shell 12 into the interior of front chamber 40. Located about connection 104 are spaced-apart circumferential passages 106. Connection 104 is coupled to the end of a flexible hose or conduit 110 which is coiled within front chamber 40 and has the other end coupled to central hub 30 to cover the outlet opening of first passage 32. Referring to FIG. 5, valve 100 comprises a coil 108, spring biased armature 109, valve seats 113 and 115, and check valve 107 of extension 103 connected to a vacuum source. Energization of coil 108 effects displacement of armature 109 which closes valve seat 113 and opens valve seat 115. The vacuum source continues to be connected with the front chamber 40 by way of extension 103, check valve 107 and passages 106, while connection 104 and conduit 110 are connected with atmosphere via air cleaner 105 and open valve seat 115.

As can be seen from the above description, a conventional brake booster unit or servo motor may be modified for use in the present invention by means of a flexible connection providing communication between a combination check valve and three-way solenoid valve and the front chamber input opening of the central hub passage communicating with the poppet valve. Other alternative embodiments can provide the same functions accomplished by the above unit, and such other structures are contemplated as being within the scope of the present invention. Example alternative embodiments illustrating how a booster unit may be modified in order to operate in accordance with the present invention, are illustrated in FIGS. 3 and 4, which will be described in detail.

Referring to FIG. 2, there is illustrated a control circuit 120 utilized with the present invention. The vehicle's battery 124 is connected to ignition switch 126 coupled by wire 127 to clutch pedal switch 128. Clutch pedal switch 128 provides an output in accordance with the position of the clutch. If the clutch pedal is depressed or "in", such that the vehicle is not in gear, then clutch pedal switch 128 provides an output through line 133 connected in series with a vehicle attitude switch 140. However, if the clutch pedal is released such that the vehicle may be "in gear" or in neutral, then clutch pedal switch 128 provides an electrical output through line 136 to the "in gear" switch 150. Vehicle attitude switch 140 may comprise any type of conventional mercury level switch or other device which will provide a switch closure when the vehicle is situated at a predetermined angle. Line 142 connects attitude switch 140 with the zero speed sensor 160. Vehicle zero speed sensor 160 comprises a sensor which receives inputs indicative of the vehicle's direction of movement and whether or not the vehicle is moving or stationary. The vehicle's back-up light switch 170 provides an electrical output through line 172 so that if the vehicle is backing up, a signal is relayed via line 172 to zero speed sensor 160 whereby an operative output signal is not effected by the sensor 160. In other words, back-up light switch 170 provides a "defeat" instruction to zero speed sensor 160. A cruise control transducer 166 normally utilized in conjunction wtih the speedometer cable of a vehicle, provides an indication of whether or not the vehicle is moving. Cruise control transducer 166 provides a pulse output to the vehicle's cruise control device (not shown), and it is the pulse output which is used also as an output signal through line 144 to zero speed sensor 160. When an electrical pulse output from transducer 166 is received by speed sensor 160, the sensor will not provide an output for operation of the combination valve 100. Zero speed sensor 160 is connected by line 176 to time delay switch 177 which is connected via line 101 to the valve 100.

Turning to another branch of circuit 120, the "in gear" switch 150 comprises a switchin the gear housing of the vehicle, which is closed whenever the vehicle is "in gear", whether stationary or moving. Switch 150 is connected via line 178 to a zero speed switch 180 coupled by mechanical connection 182 to zero speed sensor 160. If zero speed sensor 160 does not receive inputs from back-up light switch 170 and cruise control transducer 166, then an output to line 176 is effected by sensor 160 and also zero speed switch 180 is closed. However, if zero speed sensor 160 receives an input from either switch 170 or transducer 166, then zero speed switch 180 is open so that an electrical signal will not pass from line 178 to line 179. Zero speed switch 180 is connected by line 179 to a time delay relay 190. Time delay relay 190 is a conventional device that delays any output signal for a period of approximately ten seconds. Relay 190 is connected: (1) by mechanical connection 192 to a time delay relay switch 194 located between line connections 196 and 197, (2) by mechanical connection 193 to delay switch 177, and (3) by line 198 to line 197. The ignition switch 126 is connected buy line 196 to time delay switch 194 so that when the switch 194 is closed, an output is permitted through line 197 to a warning light 199 and to line 198 for transmission to relay 190. Warning light 199 may be a standard LED or other suitable illuminant visible to the vehicle operator.

Circuit 120 operates in response to a variety of circumstances or situations in order to determine if combination valve 100 should operate and provide continued braking of the vehicle so that the vehicle operator may release the brake pedal without effecting release of the vehicle brakes. A vehicular brake hillholder system finds use in cities that are very hilly, rural areas, and at railroad track crossings which typically include inclines. Many vehicle operators have experienced difficulty in keeping a manual shift vehicle from rolling backwards on an incline, because of the necessary simultaneous operation of the clutch pedal, brake pedal, shifting of the gear lever, and operation of the accelerator pedal when the operator is ready to accelerate the vehicle. The present invention provides a practical solution to this problem by providing a vehicular hill holder for manual shift vehicles which have brake booster units. The brake booster units may be either conventional vacuum brake boosters or conventional compressed air brake boosters, both types being easily modified for use in the present invention.

OPERATION

The extension 103 of combination valve 100 is coupled to the engine's intake manifold. Vacuum is provided to the valve 100 which communicates the vacuum via circumferential passages 106 to the front chamber 40 of booster 10, and via input connection 104 to conduit 110 and passage 32 in central hub 30. Passage 32 communicates vacuum through second valve seat 74 to central bore 60 and through second passage 33 to rear chamber 50. When the vehicle's operator depresses brake pedal 92, input rod 90 is displaced such that second valve seat 74 is closed and vacuum no longer communicated to chamber 50 via passage 32, central bore 60, and second passage 33. Further displacement of rod 90 opens first valve seat 72 so that atmosphere may enter rear chamber 50. Atmosphere enters rear chamber 50 through rear openings 82, filter 84, bore 61, open first valve seat 72, bore 60, and passage 33. The introduction of atmospheric pressure into rear chamber 50 and the continued provision of vacuum within front chamber 40 effects a displacement of movable wall 24 which displaces actuating rod 18 to operate the master cylinder (not shown) and effect braking of the vehicle. So far, operation of the brake booster unit is in accordance with a conventional brake booster unit. Referring to FIG. 2, if the vehicle's ignition is "on" so that ignition switch 126 is closed, and the clutch pedal has been depressed inwardly so that the vehicle is not "in gear", then clutch pedal switch 128 provides an electrical output through line 133 to vehicle attitude switch 140. If the vehicle is in an inclined position, i.e., equaling or exceeding a certain predetermined angular position caused by an incline on which the vehicle is situated, then the vehicle attitude switch is closed and permits an electrical output through line 142 to zero speed sensor 160. As a safety feature which precludes the possibility of the vehicle being in reverse and backing up which would produce a "zero speed" indication, back-up light switch 170 is provided with an input to sensor 160. If the vehicle is not in reverse gear for moving backwards, then no output is provided by light switch 170 through line 172 to sensor 160, and this defeat instruction is not present. Because the vehicle is stationary, no output is produced by cruise control transducer 166 so that there is no input signal through line 144 to sensor 160. Sensor 160 permits a continual electrical output through line 176 to time delay switch 177. Time delay switch 177 is normally closed and, in this situation, would permit an electrical signal to be communicated through line 101 to combination valve 100. Upon receiving an activation signal through line 101, the three-way solenoid valve of the valve 100 is activated so that vacuum continues to be provided via circumferential passages 106 to front chamber 40, but now atmospheric pressure enters through air filter 105 to connection 104, conduit 110, and first passage 32. Thus, when the vehicle operator removes his foot from the brake pedal, brake input rod 90 is permitted to retract slightly towards its initial rest position, by means of the springs 42, 78 and 80. This allows first valve seat 72 to close and valve seat 74 to open slightly, and permit atmospheric pressure to be communicated from passage 32 to central bore 60, passage 33, and rear chamber 50. In a conventional booster unit, at this point in operation, vacuum pressure would have been communicated via passage 32 to central bore 60, second passage 33, and rear chamber 50 in order to effect the return of movable wall 24. However, in this case atmospheric pressure continues to be provided to rear chamber 50 via passage 32, slightly open second valve seat 74, central bore 60, and second passage 33. The brakes of the vehicle remain activated, allowing the operator to remove completely his foot from the brake pedal. The continued supply of atmospheric pressure, or in the case of compressed air vacuum boosters, a second higher fluid pressure, to the rear chamber ensures that movable wall 24 remains in its activated position which effects continued actuation of the master cylinder and braking of the vehicle.

Referring again to FIG. 2, when the vehicular operator decides to accelerate the vehicle by shifting the gear lever, releasing the clutch pedal and depressing the accelerator pedal, the release of the clutch pedal opens clutch pedal switch 128 to terminate the electrical signal communicated through lines 133, 142, 176, and 101 to three-way solenoid valve of combination valve 100. The opening of this portion of circuit 120 permits the solenoid valve to return to its initial inactive position wherein vacuum is communicated again via connection 104, hose 110, passage 32, slightly open second valve seat 74, and central bore 60 to second passage 33 and rear chamber 50. Thus, deactivation of the three-way solenoid valve operatively effects deactivation of the brakes as movable wall 24 returns toward its initial at-rest position. The cessation of the supply of atmospheric pressure to rear chamber 50 permits movable wall 24 to retract under the force of spring 42, toward an inactive position which results in a full return of poppet valve 70 to the position illustrated in FIG. 1.

As follows from the detailed description above, the present invention provides a vehicular hill holder system in the form of a control circuit and a power brake booster unit that remains in an activated position in order to provide continued braking of the vehicle, when certain predetermined parameters are present. These parameters include the clutch pedal position, vehicular attitude, speed of the vehicle, and direction of movement, if any, of the vehicle. When the various parameters are present, control circuit 120 provides an electrical signal to effect operation of combination valve 100 and operatively maintain the displaced position of the movable wall 24 and activation of the brakes.

Additional safety features have been built into circuit 120 so that if certain situations should occur, booster unit 10 will not be activated and brake the vehicle at an inappropriate time. It is possible that a vehicle could be travelling on an incline when the speedometer cable of the vehicle breaks. If the speedometer cable breaks, then no input signal indicating motion of the vehicle would be provided to zero speed sensor 160. The zero speed sensor would then operate in the same manner as if the vehicle were stationary. Should the vehicle operator then depress the clutch pedal while the vehicle is moving up an incline, with a broken speedometer cable, booster unit 10 could then be activated and cause a sudden braking of the vehicle. In order to prevent this from happening, clutch pedal switch 128, "in gear" switch 150, zero speed switch 180, and time delay relay 190 are provided. In the above-described situation where the vehicle is travelling up an incline when the speedometer cable breaks, if the clutch pedal is released outwardly, then clutch pedal switch 128 permits an electrical signal to pass through line 136 to the "in gear" switch 150. If the vehicle is "in gear", then switch 150 is closed and permits the signal to pass through line 178 and closed zero speed switch 180. Zero speed switch 180 is closed because the speedometer cable is broken and sensor 160 does not operate responsively thereto. Closed zero speed switch 180 permits the signal to pass through line 179 to time delay relay 190. Time delay relay 190 delays operation of its switch contacts and the actuation of mechanical connections 192 and 193 for a period of approximately ten seconds. Once ten seconds have elapsed, mechanical connections 192 and 193 are actuated so that normally closed time delay switch 177 is opened and normally open time delay switch 194 is closed. Thus, should the vehicle operator decide to shift gears and depress the clutch pedal inwardly, an electrical output through line 133, vehicle attitude switch 140, line 142, zero speed sensor 160 and line 176 would not reach combination valve 100 and cause operation thereof. Likewise, time delay switch 194 is closed so that the warning light 199 is activated and the vehicle operator made aware of a failure in the circuit, and a signal provided through line 198 to keep relay 190 energized and switch 177 open.

If the vehicle is parked and the operator has turned on the ignition switch, depressed the clutch, and is utilizing the hill holder, operation of the hill holder will be permitted for an unlimited period of time or until the vehicle operator releases the clutch pedal in order to place the vehicle in gear. Here the hill holder system is operating at a stationary position of the vehicle when the speedometer cable is broken, whereby the vehicle operator may use the hill holder system for an unlimited period of time or until the clutch pedal is released to place the vehicle in gear. At that time, an electrical signal would pass from the now closed "in gear" switch 150 via line 178 through the zero speed switch 180 and line 179 to time delay relay 190. After a time delay period of approximately ten seconds, the contacts of mechanically connected switches 194 and 177 would transfer. Switch 177 would open to render the hill holder system inoperative. Switch 194 has a dual function wherein (1) a signal from line 196 passes along line 197 to energize warning light 199, and (2) a signal passes along line 198 to provide a latching signal to time delay relay 190. The latching signal provided to relay 190 will hold relay 190 energized, provided the ten second delay has occurred, until the ignition switch 126 is turned off. Turning off ignition switch 126 will reset the system to the normal operative ready state.

Figure 6:
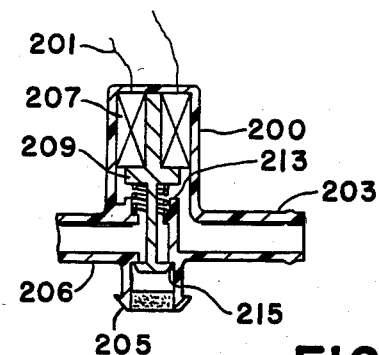

FIG. 3 illustrates an alternative brake booster embodiment having an inflatable bladder 208. A valve 200 (three-way solenoid valve) is operatively connected to the neck 202 of bladder 208 disposed within rear chamber 250 of the booster unit 210. Valve 200 provides vacuum to bladder 208 and comprises a mechanism distinct from check valve 204; the use of separate valves 200, 204 also being applicable to the embodiments of FIGS. 1 and 4. Referring to FIG. 6, valve 200 comprises a coil 207, spring biased armature 209, valve seats 213 and 215, and extensions 203 and 206. Energization of coil 207 effects displacement of armature 209 which closes valve seat 213 and opens valve seat 215. Closed valve seat 213 terminates the extension 206 connection with a source of vacuum through extension 203, and open valve seat 215 connects extension 206 with atmosphere through air cleaner 205. Booester unit 210 comprises a conventional vacuum booster unit or a booster unit utilizing compressed air. The front chamber 240 of unit 210 is provided continuously with vacuum via check valve 204 connected to the intake manifold, vacuum being communicated through first passage 232, second valve seat 274, central bore 260, and second passage 233 to rear chamber 250. Lateral displacement of the input rod 290 effects operation of poppet valve 270 in the conventional manner such that second valve seat 274 is closed to prevent vacuum from being communicated to rear chamber 250 and first valve seat 272 opens to permit atmosphere to enter central bore 260, second passage 233, and rear chamber 250. Movable wall 224 is displaced to effect actuation of a master cylinder (not shown) through the actuating rod 218. The circuit 120 described above would be used in conjunction with the embodiment of FIG. 3, and would be connected to the combination valve 200. If the vehicle is on an incline, stationary, not backing up, with the brake pedal and clutch pedal depressed, a signal would be provided via line 201 to actuate the three-way solenoid valve contained in valve 200 and permit atmosphere to be communicated through connection 206 and neck 202 to bladder 208. Atmospheric pressure would inflate bladder 208 so that it is fully inflated between movable wall 224 and rear shell 214. Thus, when the vehicle operator removes his foot from the brake pedal, even though valve seat 272 closes and valve seat 274 opens slightly, bladder 208 remains inflated and maintains the displaced position of movable wall 224 to continue braking of the vehicle. Upon release of the clutch pedal by the vehicle operator, control circuit 120 would deactivate valve 200 which again supplies vacuum to bladder 208 to deflate it and allow movable wall 224 to return to an inactive position.

Figure 7:
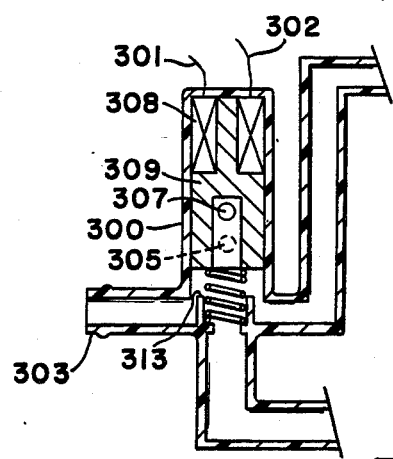

Referring to FIG. 4, a third embodiment of the brake booster unit is illustrated. A booster unit 310 includes a flexible bellows 410 at the central area thereof, one end 411 of the bellows being connected to the front shell 312 and the other end 412 connected to movable wall 324. Check valve connection 304 enables vacuum to be continuously communicated to front chamber 340, and connection 306 provides for communication of vacuum to the interior of bellows 410. The valve 300 (three-way solenoid valve) is coupled to previously described control circuit 120 so that when the control circuit operates in accordance with the above-described conditions, an electrical signal to combination valve 300 effects operation of the three-way solenoid valve contained therein. Operation of valve 300 terminates the communication of vacuum via connection 306 to the interior of bellows 410 and permits atmosphere to be communicated through connection 306, bellows 410, first passage 323, slightly open second valve seat 374, and interior bore 360 to second passage 333 and rear chamber 350. Referring to FIG. 7, valve 300 comprises an extension 303, coil 308, spring biased armature 309, valve seats 313 and openings 305 and 307. Opening 307 extends laterally from the central opening of armature 309 and can be aligned with opening 305 that includes an air cleaner. Energization of coil 308 displaces armature 309 which closes valve seat 313 and aligns hole 307 with hole 305 to permit atmosphere to be communicated through seat 313 to connection 306. A vacuum source connected with extension 303 continues to communicate with check valve 304. Thus, booster unit 310 operates in the same manner as the booster unit illustrated in FIG. 1, although unit 310 utilizes a bellows 410 to provide an alternative means for communicating vacuum or atmosphere to first passage 332 and poppet valve 370.

Although this invention has been described in connection with the illustrated embodiments, it will be obvious to those skilled in the art that various changes may be made in the form, structure, and arrangement of the parts without departing from the invention.

We claim:

1. A braking assistance servo motor system operable to maintain the braking of a vehicle when the brake pedal is released toward an inactive braking position, comprising a brake booster having a first chamber, a working chamber, first valve means responsive to the brake pedal, output means for operatively actuating brakes of the vehicle, and second valve means operatively connected with the booster, and control circuit means for sensing vehicular parameters and operatively connected to said second valve means, said brake booster operating responsively to said brake pedal by utilizing a pressure differential between the chambers to displace the output means and actuate the brakes, the control circuit means sensing the parameters of vehicular attitude, clutch position, and vehicular speed to actuate responsively thereto the second valve means and provide fluid pressure to said brake booster and maintain the displacement of the output means and actuation of the brakes after the brake pedal has been released, said control circuit means including a clutch pedal position mechanism, transmission gear switch, a second switch responsive to vehicle speed sensor means, a time-delay relay, third and fourth switches responsive to the time-delay relay, and a connection between the fourth switch and time-delay relay, the control circuit means rendering inoperative the second valve means when the vehicle speed sensor means is inoperative by effecting a signal through the clutch pedal position mechanism, transmission gear switch, second switch which is actuated by a lack of signaling from the speed sensor means, and time-delay relay which is actuated by the signal and operates the third switch to prevent actuation of the second valve means and fourth switch to permit continued energization of said time-delay relay through the connection.

2. The system in accordance with claim 1, further comprising an inflatable device disposed in the working chamber and in communication with said second valve means, said inflatable device receiving the fluid pressure to be inflated thereby and operatively maintain displacement of the output means.

3. The system in accordance with claim 1, further comprising communication means for connecting said second valve means with said first valve means, said communication means receiving said fluid pressure and transmitting the fluid pressure to the first valve means for communication with the working chamber.

4. The system in accordance with claim 3, wherein the communication means comprises a flexible conduit disposed interiorly of the booster.

5. The system in accordance with claim 3, wherein the communication means comprises a bellows disposed within said booster.

6. The system in accordance with claim 1, wherein said second valve means continuously provides lower fluid pressure to said first chamber.

7. The system in accordance with claim 1, wherein the clutch pedal position mechanism permits transmission of said signal when an associated clutch pedal is in a released position.

8. The system in accordance with claim 7, wherein a subsequent depression of the clutch pedal prevents transmission of said signal through the clutch pedal position mechanism and the fourth switch continues to permit energization of the timedelay relay through the connection which comprises an electrical connection.

9. The system in accordance with claim 7, wherein the transmission gear switch permits transmission of said signal when an associated vehicle transmission is activated and effecting movement of the vehicle.

10. The system in accordance with claim 1, wherein the operation of the fourth switch also effects operation of a warning device.

11. The system in accordance with claim 10, wherein the warning device comprises a light-emitting diode device.

12. The system in accordance with claim 10, wherein the fourth switch is connected to a vehicle ignition switch and transmits a signal to the warning device when the fourth switch is closed by said time-delay relay.

13. A braking assistance servo motor system operable to maintain the braking of a vehicle when the brake pedal is released toward an inactive braking position, comprising a casing, an assistance piston assembly displaceable in the casing and dividing the casing into two chambers, an output member actuable by the piston assembly, an input member, first valve means operatively coupled with said casing and in communication with said chambers, second valve means for controlling fluid pressure flow, means for connecting said second valve means and first valve means, and control means for sensing vehicular parameters and operatively connected to said second valve means, said second valve means providing a first fluid pressure to the second one of said chambers via the connection means and first valve means, actuation of the input member effecting actuation of said first valve means to terminate the provision of said first fluid pressure to said second chamber and admit a second fluid pressure to said second chamber and thereby cause displacement of said assistance piston assembly, the control means sensing the parameters of vehicular attitude, clutch position, and vehicular speed to actuate responsively thereto the second valve means which provides said second fluid pressure to said second chamber via the connection means and first valve means and allow deactuation of said first valve means, said control means including a clutch pedal position mechanism, transmission gear switch, a second switch responsive to vehicle speed sensor means, a time-delay relay, third and fourth switches responsive to the time-delay relay, and a connection between the fourth switch and time-delay relay, the control means rendering inoperative the second valve means when the vehicle speed sensor means is inoperative by effecting a signal through the clutch pedal position mechanism, transmission gear switch, second switch which is actuated by a lack of signaling from the speed sensor means, and time-delay relay which is actuated by the signal and operates the third switch to prevent actuation of the second valve means and fourth switch to permit continued energization of said time-delay relay through the connection.

14. A brake booster-assisted braking system operable on an incline to maintain braking of a vehicle with the brake pedal released by the vehicle operator, comprising a casing having a valve disposed adjacent one end wall of the casing and actuated by an operatively connected brake pedal, actuating rod means engaging the valve means and extending through the other end wall of the casing to operatively engage brake actuator means, a movable wall disposed in the casing to divide the casing into a fist chamber and a second chamber and acting on said actuating rod means, control valve means for communicating fluid pressures to the interior of said casing, connection means for connecting said control valve means with said valve, and control circuit means for sensing vehicular parameters and connected to said control valve means, displacement of the operatively connected brake pedal actuating said valve to terminate the communication of a first fluid pressure from said control valve means to said second chamber via the connection means and valve and providing a second fluid pressure to said second chamber to effect a pressure differential between said chambers which causes displacement of said movable wall and actuating rod means to operate the brake actuator means and effect braking of the vehicle, the control circuit means sensing the parameters of vehicular attitude, clutch position, and vehicular speed and responsively thereto actuating the control valve means so that said second fluid pressure is provided by the control valve means to the second chamber via the connection means and valve to maintain the braking of the vehicle upon release of the brake pedal which deactivates the valve, said control circuit means including a clutch pedal position mechanism, transmission gear switch, a second switch responsive to vehicle speed sensor means, a time-delay relay, third and fourth switches responsive to the time-delay relay, and a connection between the fourth switch and time-delay relay, the control circuit means rendering inoperative the control valve means when the vehicle speed sensor means is inoperative by effecting a signal through the clutch pedal position mechanism, transmission gear switch, second switch which is actuated by a lack of signaling from the sensor means, and time-delay relay which is actuated by the signal and operates the third switch to prevent actuation of the control valve means and fourth switch which is actuated and permits continued energization of said time-delay relay through the connection.

15. The brake booster-assisted braking system according to claim 14, wherein said control circuit means senses the parameters of vehicular attitude, clutch position, ignition status, vehicular speed, and vehicular direction.

16. The brake booster-assisted braking system according to claim 15, wherein said control valve means comprises the combination of a check valve and a three-way solenoid valve operating responsively to signals from said control circuit means, so that operation of the three-way solenoid valve effects a continued supply of the first fluid pressure to said first chamber and the supply of said second fluid pressure to the second chamber via the connection means and valve.

17. The brake booster-assisted braking system according to claim 15, wherein the connection means comprises a flexible tube having one end connected to said control valve means and the other end connected to said valve.

18. The brake booster-assisted braking system according to claim 16, wherein the connection means is disposed interiorly of said casing.

19. The brake booster-assisted braking system according to claim 15, wherein the brake booster comprises a vacuum brake booster with the first fluid pressure providing vacuum and the second fluid pressure comprising atmospheric pressure.

20. The brake booster-assisted braking system according to claim 14, wherein said control valve means continuously supplies said first pressure to the first chamber.

21. The brake booster-assisted braking system according to claim 15, wherein the control circuit means includes a connection with a back-up light switch.

22. A vehicle brake booster system utilizing a pressure differential to effect braking of the vehicle, comprising: a casing having a valve actuated by an operatively connected brake pedal, master cylinder actuating means connected with the valve, at least one interior movable wall dividing the casing into a front chamber and a rear working chamber and acting on said actuating means, an inflatable device disposed in said rear working chamber for engagement with said interior movable wall, control valve means for communicating with said inflatable device, and control circuit means for sensing vehicular parameters and operatively connected to said control valve means, displacement of the brake pedal actuating said valve to terminate the provision of a first fluid pressure to the rear working chamber and provide through said valve a second fluid pressure to said rear working chamber in order to displace said movable wall, and said control circuit means selectively actuating said control valve means which effects the supply of said second fluid pressure to said device to effect inflation thereof such that the device expands against said movable wall and maintains the displaced position of the wall when said brake pedal is released and deactuates said valve, said control circuit means including a clutch pedal position mechanism, transmission gear switch, a second switch responsive to vehicle speed sensor means, a time-delay relay, third and fourth switches responsive to the time-delay relay, and a connection between the fourth switch and time-delay relay, the control circuit means rendering inoperative the control valve means when the vehicle speed sensor means is inoperative by effecting a signal through the clutch pedal position mechanism, transmission gear switch, second switch which is actuated by a lack of signaling from the sensor means, and time-delay relay which is actuated by the signal and operates the third switch to prevent actuation of the control valve means and fourth switch to permit continued energization of said time-delay relay through the connection.

23. The vehicle brake booster system in accordance with claim 22, wherein said inflatable device has an outlet extending through an opening in the casing of the booster, the outlet connected to said control valve means.

24. The vehicle brake booster system in accordance with claim 22, wherein said inflatable device comprises an inflatable bladder disposed in the rear working chamber between the movable wall and the casing, the bladder receiving said first fluid pressure from said control valve means prior to actuation of said control valve means by said control circuit means.

25. A process for maintaining actuation of a vehicular braking assistance servo motor when the vehicle is situated on an incline, comprising the steps of: (a) coupling first valve means with a casing of a servo motor and in operative connection with an input member, an output member, and an assistance piston assembly dividing the casing into chambers, (b) locating second valve means for communiation with a first chamber of said chambers, (c) connecting means for communication to said second valve means and said first valve means, (d) coupling control circuit means with said second valve means, the control circuit means operating responsively to the parameters of vehicular attitude, clutch position, transmission gear engagement, and vehicular speed, (e) supplying a first fluid pressure to said second valve means for joint communication of the first fluid pressure to said first chamber and to a second chamber of said chambers, the second chamber receiving said first fluid pressure via the communiation means and first valve means, (f) displacing said input member to actuate said first valve means which terminates the supply of said first fluid pressure to the second chamber and provides a second fluid pressure to the second chamber, and thereby effecting displacement of said assistance piston assembly and output member, (h) maintaining the displaced position of said assistance piston assembly when said vehicle is stationary on an incline, by actuating the second valve means responsively to said control circuit means in order to provide a continuous supply of said second fluid pressure through said communication means and first valve means to the second chamber upon deactuation of said first valve means, and (i) preventing actuation of the second valve means when speed sensor means of said control circuit means is inoperative, the control circuit means responding to the parameters of clutch position, transmission gear engagement and the inoperativeness of said speed sensor means to operate a time-delay relay which prevents a signal from activating said second valve means, the control circuit means including a connection providing continued energization of the time-delay relay after operation thereof.

26. The process in accordance with claim 25, further comprising the step of disposing said communiation means interiorly of said casing.

27. The process in accordance with claim 25, further comprising the step of ceasing maintenance of said displaced position of the piston assembly by deactuating the second valve means responsively to the parameters of vehicular attitude, clutch position, and vehicular speed as sensed by said control circuit means.

28. A process for maintaining actuation of a vehicular braking assistance servo motor when the vehicle is situated on an incline, comprising the steps of: (a) coupling first valve means with a casing of a servomotor and in operative connection with an input member, an output member, and an assistance piston assembly dividing the casing into chambers, (b) locating second valve means for communiation with said servo motor, (c) coupling control circuit means with said second valve means, the control circuit means operating responsively to the parameters of vehicular attitude, clutch position, transmission gear engagement, and vehicular speed, (d) displacing said input member to actuate said first valve means which effects displacement of said assistance piston assembly and output member by means of a pressure differential between the chambers, (e) maintaining the displaced position of said assistance piston assembly when said vehicle is stationary on an incline and the first valve means deactuated, by actuating the second valve means responsively to said control circuit means in order to provide a fluid pressure to said servo motor to maintain actuation thereof, and (f) preventing actuation of the second valve means when speed sensor means of said control circuit means is inoperative, the control circuit means responding to the parameters of clutch position, transmission gear engagement and the inoperativeness of said speed sensor means tooperate a time-delay relay which prevents a signal from activating said second valve means, the control circuit means including a connection providing continued energization of the time-delay relay after operation thereof.

29. The process in accordance with claim 28, further comprising the step of supplying said fluid pressure through said second valve means to inflate bladder means in a chamber of said casing.

30. The process in accordance with claim 28, further comprising the step of disposing interiorly of the casing communication means for transmitting fluid pressure from the second valve means to the first valve means.

31. The process in accordance with claim 28, further comprising the step of the second valve means supplying lower fluid pressure to one of said chambers.

* * * * *